United States Patent
Cheng et al.

(10) Patent No.: US 10,129,364 B2
(45) Date of Patent: Nov. 13, 2018

(54) DATA CONSISTENCY MAINTENANCE FOR SEQUENTIAL REQUESTS

(71) Applicant: International Business Machines Corporation, Armonk, NY (US)

(72) Inventors: Qi Jian Cheng, Beijing (CN); Qining Li, Beijing (CN); Jing Sun, Beijing (CN); Lei Sun, Beijing (CN); Tianyi Wang, Beijing (CN); Yan Zhao, Beijing (CN); Chuan Jie Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/870,063

(22) Filed: Sep. 30, 2015

(65) Prior Publication Data
US 2017/0094011 A1    Mar. 30, 2017

(51) Int. Cl.
    *G06F 15/16*     (2006.01)
    *H04L 29/08*     (2006.01)

(52) U.S. Cl.
    CPC ...... H04L 67/2852 (2013.01); H04L 67/2885 (2013.01)

(58) Field of Classification Search
    CPC ......... G06F 17/30371; G06F 17/30575; H04L 61/1582; H04L 67/1095; H04L 67/2842; H04L 67/2852; H04L 67/2885
    USPC .................................................. 709/203–238
    See application file for complete search history.

(56) References Cited

U.S. PATENT DOCUMENTS

| | | | |
|---|---|---|---|
| 6,256,712 B1 | 7/2001 | Challenger et al. | |
| 6,725,392 B1 * | 4/2004 | Frey | G06F 11/1076 714/15 |
| 6,769,048 B2 | 7/2004 | Goldberg et al. | |
| 7,543,066 B2 * | 6/2009 | Colasurdo | H04L 29/06 709/203 |
| 8,108,523 B2 * | 1/2012 | Kinder | H04L 29/12283 709/226 |
| 8,583,810 B2 | 11/2013 | Turk | |
| 8,627,012 B1 * | 1/2014 | Derbeko | G06F 12/0868 707/657 |
| 8,635,185 B2 | 1/2014 | Somogyi et al. | |
| 8,914,583 B1 * | 12/2014 | Clark | G06F 3/061 711/112 |
| 9,053,033 B1 * | 6/2015 | Derbeko | G06F 12/0871 |
| 9,141,309 B1 * | 9/2015 | Brooker | G06F 3/0689 |

(Continued)

OTHER PUBLICATIONS

IBM Appendix P, "List of IBM Patents or Patent Applications to be Treated as Related", Dated Mar. 24, 2017, 2 pages.

(Continued)

*Primary Examiner* — Moustafa M Meky
*Assistant Examiner* — Thorne E Waugh
(74) *Attorney, Agent, or Firm* — Isaac J. Gooshaw (57) ABSTRACT

A method, computer program product and computer system is provided. A processor receives a read request for a data entry from a client device, where the read request includes a first identifier. A processor retrieves a second identifier from a first storage device, where the second identifier is associated with the data entry as stored in the first storage device. Responsive to the first identifier and the second identifier not matching, a processor updates the data entry of the first storage device with a corresponding data entry from a second storage device.

12 Claims, 5 Drawing Sheets

(56) References Cited

U.S. PATENT DOCUMENTS

| | | | |
|---|---|---|---|
| 9,251,073 B2* | 2/2016 | Steely | G06F 12/0828 |
| 9,268,711 B1* | 2/2016 | Clark | G06F 12/0871 |
| 9,448,932 B2* | 9/2016 | Jenkins | G06F 12/0815 |
| 9,489,304 B1* | 11/2016 | Swarbrick | G06F 13/00 |
| 2015/0074065 A1* | 3/2015 | Christ | G06F 3/067 |
| | | | 707/692 |
| 2015/0100664 A1 | 4/2015 | Flack et al. | |

OTHER PUBLICATIONS

Cheng et al., "Data Consistency Maintenance for Sequential Requests", U.S. Appl. No. 15/468,182, pp. 1-19.

Cao et al., "Maintaining Strong Cache Consistency in the World Wide Web", IEEE Transactions on Computers, vol. 47, No. 4, Apr. 1998, pp. 445-457.

Franklin et al., "Transactional Client-Server Cache Consistency: Alternatives and Performance", ACM Transactions on Database Systems, vol. 22, No. 3, Sep. 1997, pp. 315-363.

\* cited by examiner

DATA CONSISTENCY MAINTENANCE FOR SEQUENTIAL REQUESTS

BACKGROUND OF THE INVENTION

This invention is related to data processing, and more specifically, to data consistency maintenance for sequential requests.

In network-based applications such as web applications, user data may be fetched frequently. However the user data may not be updated or changed as frequently. Therefore, the user data is stored in data caches to speed up the retrieval of the user data. In one scenario, a cluster of servers each have their own data cache for accessing user data. Several data requests may be sent out from a client to the servers in a relatively short time, including a write request and a subsequent read request of the data. For example, a distributed server network provides an e-commerce platform for user to purchase items. A user may add one item to his or her shopping cart in a client application. As a result, the client may send a write request to update order information and then send a read request to obtain some information related to the updated order information to be displayed on the client. In a distributed or cloud computing environment, the write request and the read request may be directed to different servers. In such a situation, the caches of both servers may not be in sync when the requests are received. Typically to synchronize caches, the section of a cache with out-of-sync data is invalidated (e.g., cache invalidation) and rewritten with the correct current data. However, in high traffic volume environments, cache invalidation may not be completed on all of the backend servers due to the relatively short time between the data requests. Therefore, the latter read request may not be able to get the latest information updated by the former write request. One existing solution for such problem is referred to "session affinity", which is a mechanism to make sure that multiple requests from a same session be handled by the same server. However, this mechanism may introduce limitations and difficulties in scalability to distributed systems as well as overall throughput of the system.

SUMMARY

Embodiments of the present invention provide a method, system, and program product to provide data consistency in a distributed computing environment. A processor receives a read request for a data entry from a client device, where the read request includes a first identifier. A processor retrieves a second identifier from a first storage device, where the second identifier is associated with the data entry as stored in the first storage device. Responsive to the first identifier and the second identifier not matching, a processor updates the data entry of the first storage device with a corresponding data entry from a second storage device.

DETAILED DESCRIPTION

While solutions to data consistency are known they typically require additional load balancing devices or software to maintain performance when a cache's data is invalid. The additional devices or software makes scalability difficult. Embodiments of the present invention recognize that by storing an identifier on a client device, that data consistency can be maintained and cache invalidation can be performed with minimal impact to a system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
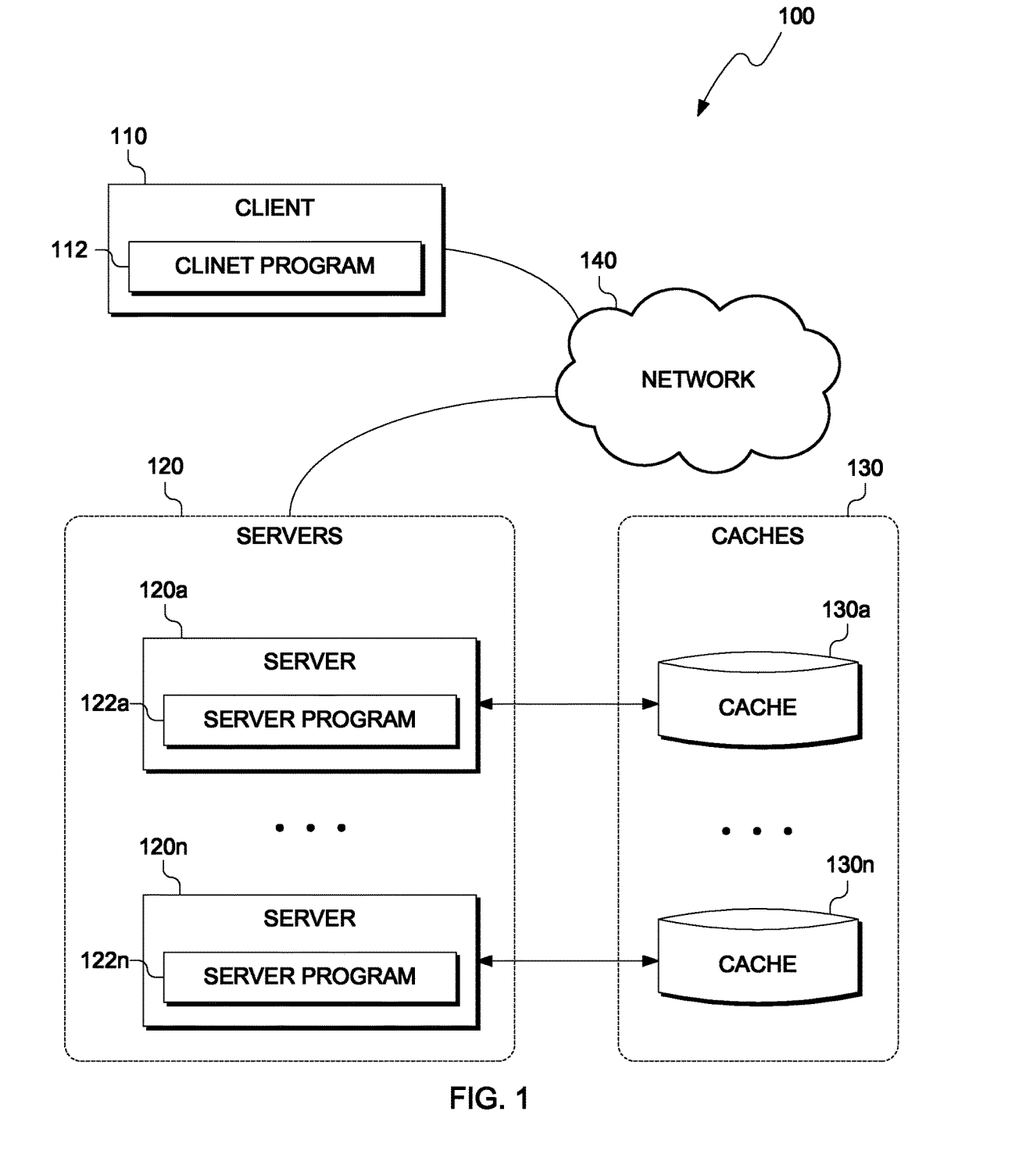
FIG. 1 is a functional block diagram illustrating a networked environment, in accordance with an embodiment of the present invention.

The present invention will now be described in detail with reference to the Figures. FIG. 1 is a functional block diagram illustrating networked environment, generally designated 100, in accordance with one embodiment of the present invention. Networked environment 100 includes client 110, servers 120a-n (collectively referred to as servers 120) and caches 130a-n (collectively referred to as caches 130) connected over network 140. Client 110 includes client program 112. Servers 120 include a respective server program of server programs 122a-n (collectively referred to as server programs 122).

In various embodiments of the present invention, client 110 and servers 120 are each a computing device that can be a standalone device, a server, a laptop computer, a tablet computer, a netbook computer, a personal computer (PC), or a desktop computer. In another embodiment, client 110 and servers 120 each, collectively, or any combination thereof, represent a computing system utilizing clustered computers and components to act as a single pool of seamless resources. In general, client 110 and servers 120 can each, collectively, or any combination thereof, be any computing device or a combination of devices with access to caches 130 and is capable of executing client program 112 and server programs 122. Client 110 and servers 120 may include internal and external hardware components, as depicted and described in further detail with respect to FIG. 5.

In this exemplary embodiment, client program 112 is stored on client 110. Server programs 122 are stored on the respective server of servers 120. However, in other embodiments, client program 112 and server programs 122 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between client program 110 and server programs 120, in accordance with a desired embodiment of the present invention.

Networked environment 100 includes client 110 and one or more servers 120. Each of the servers in servers 120 is connected to a cache of caches 130. Caches 130 includes one or more data storage devices for caching data that is frequently accessed by servers 120. In one embodiment, each of the servers of servers 120 is associated with a respective cache of caches 130 (e.g., server 120a is connected to and communicates with cache 130a and server 120n is connected and communicates with cache 130n). In other embodiments, a server of servers 120 is associated with any number of caches from caches 130. Furthermore, a cache of caches 130 may be shared by two or more servers of servers 120.

In various embodiments, client 210 includes client program 112 for accessing applications or services provided by servers 120. For example, client program 112 may a web browser and servers 120 provide an e-commerce platform. In various embodiments, each of the servers of servers 120 includes a respective server program of server programs 122. User program 112 send requests to server programs 122 for reading and/or writing data. For example, a user of client program 112 may add one item to his/her shopping cart in the e-commerce platform. In response, client program 112 causes client 110 to send a write request to update order information to server program 122. Additionally, client 110 may send a read request in a relatively short time after the item is added to a shopping cart to display updated order information to the user via client program 112.

One or ordinary skill in the art will appreciate that in a distributed computing environment where multiple servers or devices perform a variety of tasks, the write request and the read request may be directed to different servers of servers 220. For example, the write request is directed to a first server and received by its respective server program (e.g., server program 122a of server 120), while the read request is directed to another server and received by its respective server program (e.g., server program 122n of server 120n). In this example, server 120a is communicatively coupled to cache 130a and server 120n is communicatively coupled to cache 130n. As such, a data entry for recording the order information in the cache 130a that is associated with the server 120a may be updated in response to the write request. To maintain data consistency among caches 130, other caches not included in the write request are instructed to invalidate the copy of the data entry corresponding to the received write request. The other caches synchronize the data entries to the corresponding values of the recently written cache. However, this process may take time to perform due to the latency of cache invalidation. Consequently in some scenarios, the read request discussed above may arrive at the server 120n before cache invalidation of the cache 130n completes. If so, the value returned in the read response by server program 122n would be inconsistent with the latest value written to cache 130a that was updated by the write request. As such, data consistency is lost and errors may occur.

Figure 2:
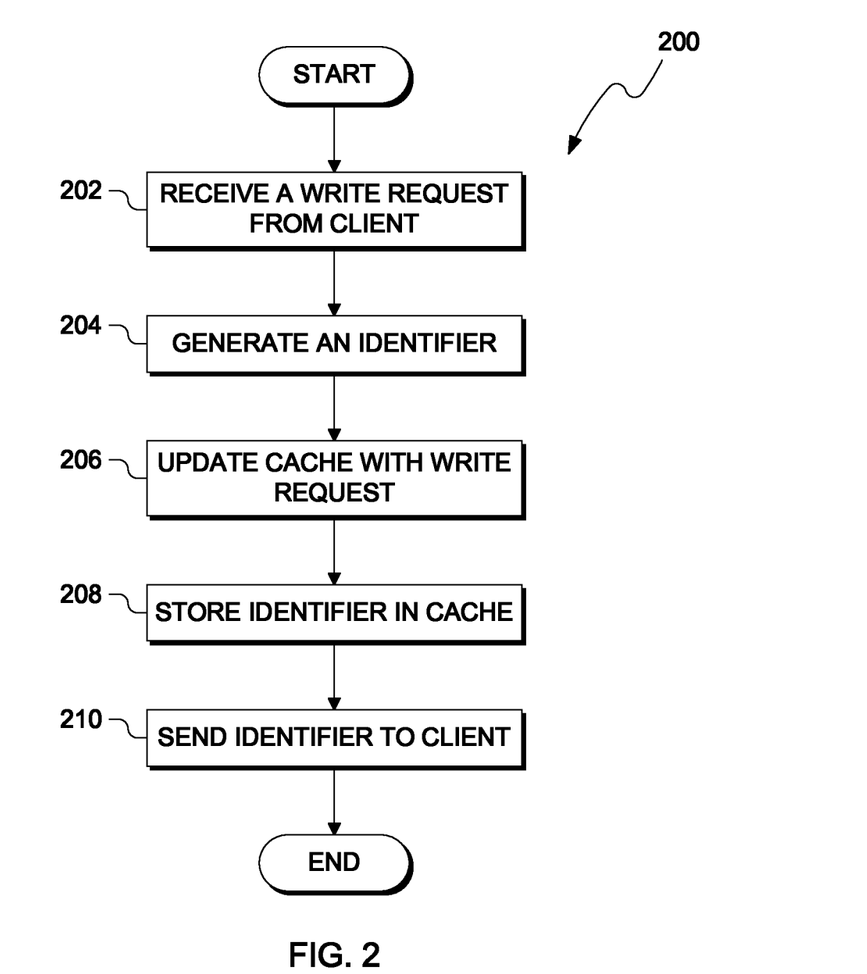
FIG. 2 illustrates operational processes of a server program receiving a write request, executing on a computing device within the environment of FIG. 1, in accordance with an embodiment of the present invention.

FIG. 2 illustrates operational processes, generally designated 200, of a server program receiving a write request. In process 202, a server program receives a write request. The write request includes a new value for a data entry. In some scenarios, the data entry is a preexisting entry (e.g., an address of a user in a profile). In other scenarios, the data entry creates a new entry (e.g., an item's product number when added to an online shopping cart). In various embodiments, the received write request is directed to at least one server, such as server 120a. The respective server program of the server receiving the write request (e.g., server program 122a) handles the write request as discussed herein and in particular in process 206 to the respective cache or caches of the write receiving server (e.g., cache 130a).

In process 204, the server program generates an identifier in response to receiving a write request. As discussed herein and in various embodiments, the identifier is used by server programs 122 to determine if the accessible cached copy of the data entry related to the write request is up-to-date, such as when a later read request is received. In some embodiments, the identifier may be generated based on a timestamp of when the write request was received or when the generation of the identifier occurs. The write receiving server program retrieves a current time value from the respective server executing the server program. In another embodiment, the server program creates a random string or value to represent the pending change in data due to the write request. In another embodiment, the server program generates a hash value of the data included in the write request. One of ordinary skill in the art will appreciate that any combination of techniques or processes may be used to create an identifier. Furthermore the length or complexity of the identifier may be selected to provide a choice between a fast comparison (i.e., shorter identifiers) and less collisions or similar identifiers (i.e., longer identifiers). In some embodiments, the identifier may be generated with a predefined lifetime. The predefined lifetime may suggest a specified time period after which the identifier is valid. As such, the predefined lifetime of an identifier provides a mechanism to prevent more identifiers from being created if additional write requests are received.

In another embodiment, client program 112 generates an identifier for the write request prior to sending the request to a server in servers 120. Instead of process 204 being performed by the write receiving server program, client program 112 generates an identifier in a similar manner as discussed in regards to process 204 (e.g., by using a time stamp, random identifier or a hash value of the write request). In such an embodiment, client program 112 sends the identifier in addition to the write request. In response, the write receiving server program additionally receives the identifier in process 202 from client program 112. In this embodiment, the write receiving server program uses the received identifier in a similar manner in embodiments where the write receiving server program generates an identifier, as discussed in regards to processes 206 and 208.

In process 206, the write receiving server program of the write request updates the communicatively coupled cache or caches with the data included in the write request. In process 208, the write receiving server program also stores the identifier in association with the data entry of the write request. After completing the requested writing for the data entry (process 206), the write receiving server program also writes the identifier to the cache or caches. In some embodiments, the generated identifier may be added into the updated data entry as a part of the cached value of the data entry. In some embodiments, the identifier may be stored in a table or other data structure of the cache or caches. In some scenarios, the write receiving server program sends an indication to other server programs 122 that the respective cache associated with the server of the write receiving server program has been updated. In response, the other server programs 122 invalidate the respective cache entries corresponding to the updated data entries and synchronize the data entry among all caches 130. During the cache invalidation and subsequent synchronization, any of the servers 120 may receive a read request for the data associated with the cache invalidation. As discussed herein, the generated identifier provides a mechanism to validate the data consistency of the data entry for any cache of caches 130. In embodiments where the write receiving server program generates an identifier, the receiving server program sends the identifier to client program 112 (process 210).

Figure 3:
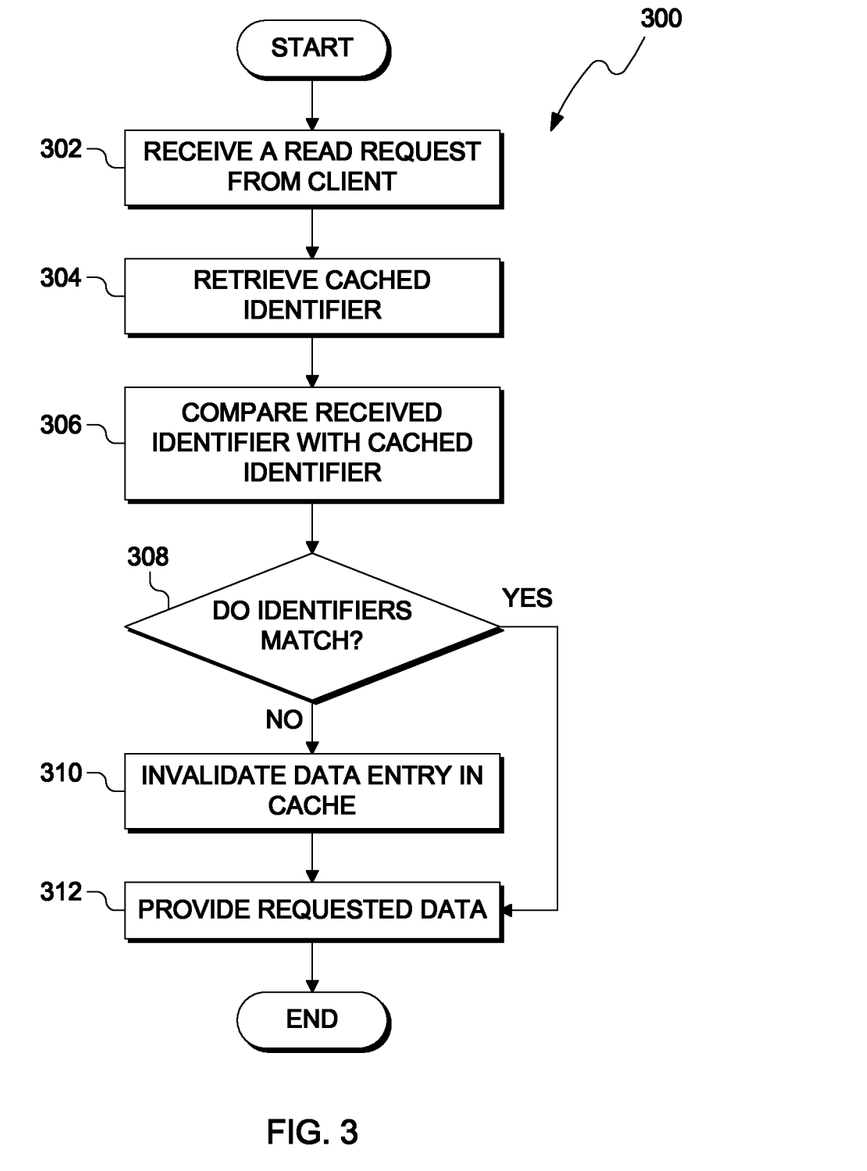
FIG. 3 illustrates operational processes of a server program receiving a read request, executing on a computing device within the environment of FIG. 1, in accordance with an embodiment of the present invention.

FIG. 3 illustrates operational processes, generally designated 200, of a server program receiving a write request. As discussed herein, client program 112 may send a read request to a server of servers 120 that has yet to synchronize the communicatively coupled cache of the read receiving server. In various embodiments, the corresponding read receiving program handling the read request compares a received identifier from client program 112 to the identifier in cache for a given data entry. If a mismatch occurs, then the corresponding cache or caches for the read receiving server have not invalidated the out-of-date data entry to match the previously written data entry in another cache, such as the cache of the server that received the write request as discussed herein and particularly in FIG. 2.

In process 302, the read receiving server program receives a read request from client program 112. The read request includes, but is not limited to, a request for a data entry to be read and an identifier associated with the data entry. In some embodiments, a write receiving sever program generated the identifier when receiving a write request from client program 112, sending the generated identifier to client program 112 after the write to a cache communicatively coupled to the server of the write receiving sever program has occurred. In other embodiments, client program 112 generates the identifier, storing the identifier locally and sending the identifier as part of the write request. As such, the write receiving sever program writes the identifier to the cache communicatively coupled to the server of the write receiving sever program.

In process 304, the read receiving server program retrieves the cached identifier from the cache communicatively coupled to the server of the read receiving sever program. In various embodiments, each data entry in cache has an identifier associated with the entry. When a read request for a data entry is received, the read receiving server program retrieves the identifier from the cache communicatively coupled to the server of the read receiving sever program. As discussed herein, the read request may be received before the cache of the server of the read receiving sever program has invalidated the cache associated with the data entry and synchronized with another cache (e.g., the cache of the server of the write receiving server program).

In process 306, the read receiving server program compares the received identifier from client program 112 to the retrieved cached identifier. In decision process 308, if the identifiers match (YES branch of decision process 308), the read receiving server program provides the requested data from the cache communicatively coupled to the server of the read receiving server program (process 312). In this scenario, the portion of cache associated with the data entry has been previously invalidated and synchronized. If the identifiers do not match or are different, then the read receiving server program invalidates the portion of cache associated with the data entry of the read request and updates the data entry in cache communicatively coupled to the server of the read receiving server program (process 310). Once the data entry has been updated, then the read receiving server program provides the requested data (process 312).

Figure 4:
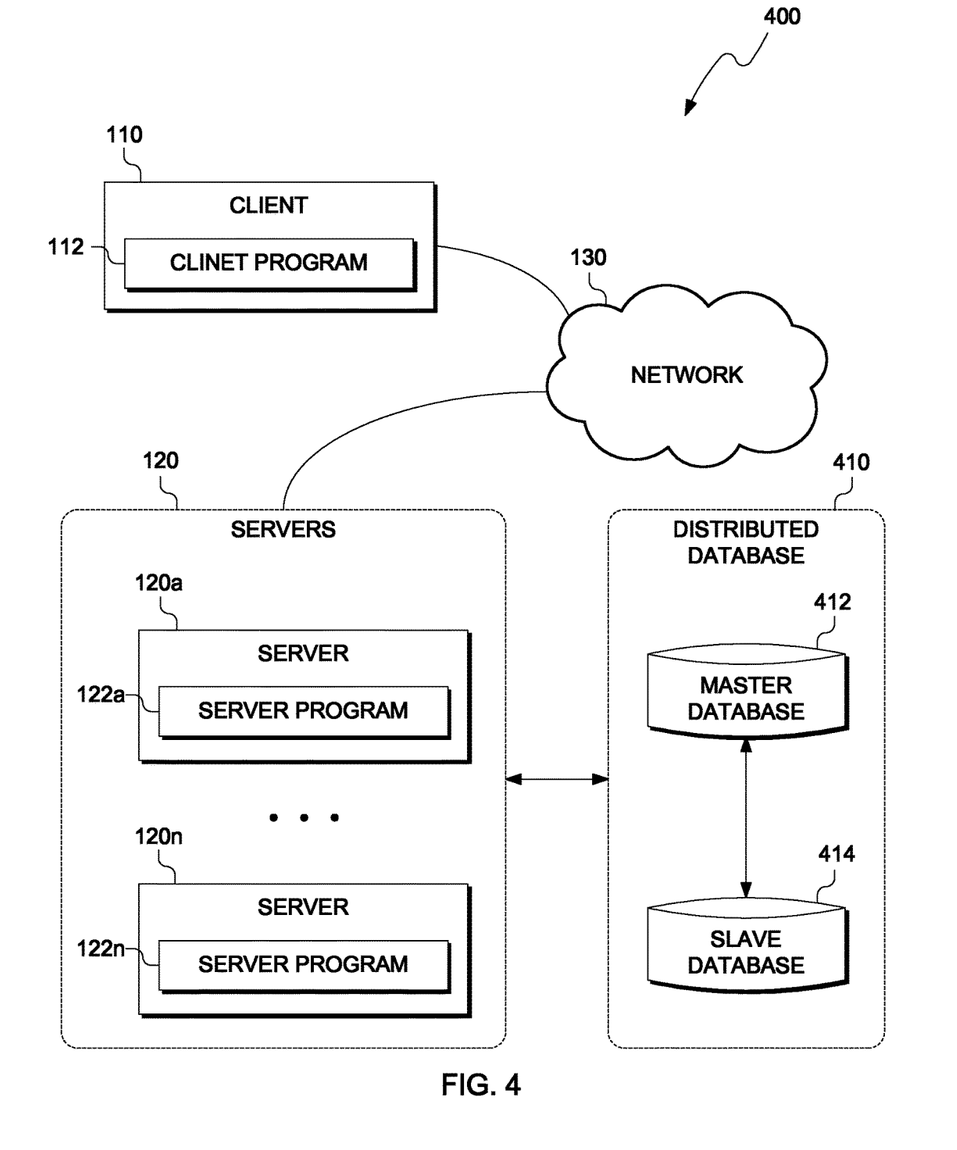
FIG. 4 is a functional block diagram illustrating a networked environment, in accordance with an embodiment of the present invention.

FIG. 4 shows another environment 400 in which embodiments of the present invention can be implemented. Instead of caching data in caches 130 associated with the servers 120 respectively as in the example in FIG. 1, in the environment 400, the servers 120 may read/write data from/to distributed databases 410 in a master-slave topology. More particularly, as shown in FIG. 4, a server may access a master database 412 to write a value of a data entry and access a slave database 414 to read a value of a data entry.

As discussed herein, client program 112 may send several requests to the server programs 122 for reading or writing data. For example, a user of the client program 112 may add one item to his or her shopping cart in the e-commerce web application executed on the client 110. As a result, client program 112 may send a write request to update order information, and then send a read request in a relatively short time to obtain some information related to the updated order information. For example, the write request and the read request may be directed to a same server program (e.g., server 122a). In this case, a data entry for recording the order information in the master database 412 may be updated in response to the write request. The slave database 414, which stores a copy of the data entry, may be informed to synchronize with the master database 412 to update the value of the data entry, similar to the cache invalidation discussed herein. However, due to the latency of database synchronization, the read request may arrive at the receiving server program before database synchronization of the slave database 414 completes. If so, the read request may cause receiving server program to obtain a value of the data entry from the slave database 414. Therefore, the read request may not be able to get the latest value of the data entry updated by the write request. As such, a data consistency issue arises. The methods 200 and 300 can be performed in the environment 400 to prevent such data consistency issue from happening, which will be described in detail as below in connection with the example shown in FIG. 4.

Client program 112 sends a write request for a data entry (e.g., process 202). For example, the write request may be directed to the server 2203. The write receiving server program handles the write request to master database 412 (e.g., process 206). In response to the write request, the write receiving server program generates an identifier (e.g., process 204). Then, the write receiving server program stores the identifier in master database 412, associating the identifier with the written data entry (e.g., process 208). For example, after completing the requested writing for the data entry, a value of the data entry stored in master database 412 may be updated, with the generated identifier being stored as a part of the stored value of the data entry. The write receiving server program provides client program 112 with the generated identifier (e.g., process 210).

The received identifier may be maintained by client program 112 to be used for subsequent read requests, for the same data entry corresponding to the write request. As such, client program 112 sends a subsequent read request for the data entry to obtain a value of the data entry, the read request including the identifier maintained by client program 112 (e.g., process 302). A server of server 120, the read receiving server program, handles the read request. In some scenarios, the read receiving server program may be the associated with the same server as the write receiving server program. In other scenarios, the server of the read receiving server program is a different server of servers 120 than the write receiving server program.

The read receiving server program retrieves an identifier from the slave database 414 (e.g., process 304). The read receiving server program responds to the read request by matching the received identifiers from client program 112 and the identifier stored in slave database 414 (e.g., process 306). If the read receiving server program determines the identifiers match, then read receiving server program provides the requested data for a read to client program 112 with the value of the data entry retrieved from the slave database 414 (e.g., YES branch of process 308 and process 312). If the identifiers dot not match, read receiving server program synchronizes the data entry by triggering a database synchronization of the master database 412 and slave database 414 (e.g., NO branch of decision process 308 and process 310). Then, the read receiving server program can provide client program 112 with a synchronized value of the data entry (e.g., process 312).

In practice, the environments 100 and 400 may be combined to be a hybrid environment which may involve both caches and databases in a master-slave topology, for example. For the sake of clarity, such hybrid environment is not shown herein. This is merely for the purpose of simplifying the description, without suggesting any limitations as to the scope of the invention. It is to be understood that all features as described above with reference to FIG. 1 to FIG. 4 apply to such a hybrid environment.

Figure 5:
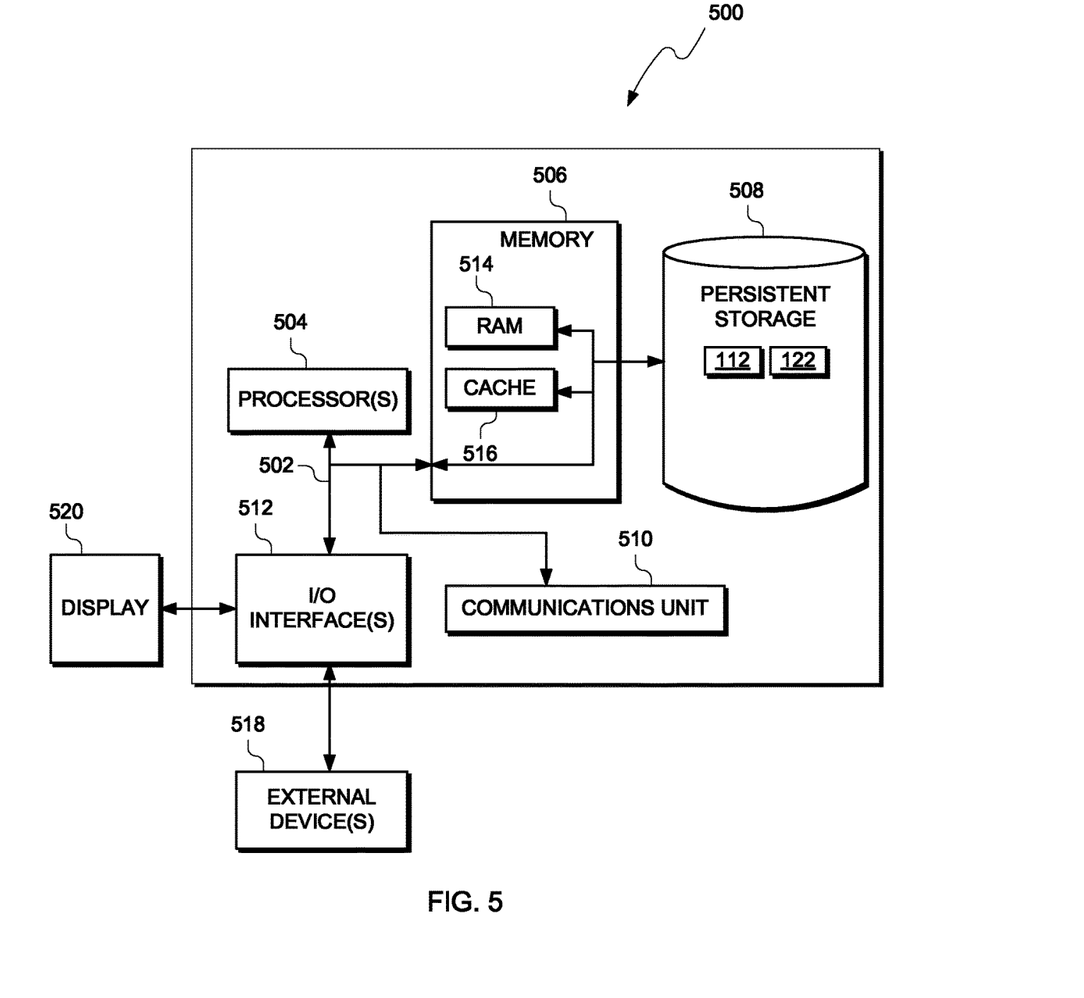
FIG. 5 depicts a block diagram of components of the computing device executing a client program and a server program, in accordance with an embodiment of the present invention.

FIG. 5 depicts a block diagram, 500, of components of client 110 and servers 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client 110 and servers 120 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Client program 112 and server programs 122 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. Client program 112 and server programs 122 may be downloaded to persistent storage 508 through communications unit 510.

I/O interface(s) 512 allows for input and output of data with other devices that may be connected to client 110 and servers 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., client program 112 and server programs 122, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A computer program product comprising:
one or more computer-readable storage media and program instructions stored on the one or more computer-readable storage media, the program instructions comprising:
responsive to receiving, from a client device, a write request for a data entry stored on a first storage device, program instructions to:
(i) write the data entry to the first storage device; and
(ii) generate a first identifier associated with the data entry stored on the first storage device;
program instructions to send the first identifier to the client device;
responsive to receiving a read request for the data entry from the client device, program instructions to retrieve the data entry from a second storage device, wherein the read request includes the first identifier;
program instructions to retrieve a second identifier from the second storage device, wherein the second identifier is associated with the data entry stored on the second storage device; and
responsive to the first identifier and the second identifier not matching, program instructions to update the data entry stored on the second storage device with the data entry stored on the first storage device.

2. The computer program product of claim 1, wherein the first storage device and the second storage device are both cache storage devices.

3. The computer program product of claim 2, wherein program instructions to update the data entry of the second storage device further comprises:
program instructions to send a command to invalidate a portion of cache of the second storage device associated with the data entry.

4. The computer program product of claim 1, wherein the first storage device is a master database and the second storage device is a slave database.

5. The computer program product of claim 4, wherein program instructions to update the data entry of the second storage device further comprises:
 program instructions to sending a command to synchronize the slave database with the master database.

6. The computer program product of claim 1, wherein program instructions to generate the first identifier further comprises:
 program instructions to generate the first identifier based, at least in part, on one of the following: (i) a timestamp; (ii) a random value; or (iii) a hash value.

7. A computer system comprising:
 one or more computer processors;
 one or more computer readable storage media; and
 program instructions stored on the computer readable storage media for execution by at least one of the one or more processors, the program instructions comprising:
  responsive to receiving, from a client device, a write request for a data entry stored on a first storage device, program instructions to generate a first identifier associated with the data entry stored on the first storage device;
  program instructions to send the first identifier to the client device;
  responsive to receiving a read request for the data entry from the client device, program instructions to retrieve the data entry from a second storage device, wherein the read request includes the first identifier;
  program instructions to retrieve a second identifier from the second storage device, wherein the second identifier is associated with the data entry stored on the second storage device; and
  responsive to the first identifier and the second identifier not matching, program instructions to update the data entry stored on the second storage device with the data entry stored on the first storage device.

8. The computer system of claim 7, wherein the first storage device and the second storage device are both cache storage devices.

9. The computer system of claim 8, wherein program instructions to update the data entry of the second storage device further comprises:
 program instructions to send a command to invalidate a portion of cache of the second storage device associated with the data entry.

10. The computer system of claim 7, wherein the first storage device is a master database and the second storage device is a slave database.

11. The computer system of claim 10, wherein program instructions to update the data entry of the second storage device further comprises:
 program instructions to sending a command to synchronize the slave database with the master database.

12. The computer system of claim 7, wherein program instructions to generate the first identifier further comprises:
 program instructions to generate the first identifier based, at least in part, on one of the following: (i) a timestamp; (ii) a random value; or (iii) a hash value.

* * * * *